United States Patent
Cain et al.

(10) Patent No.: US 9,380,070 B1
(45) Date of Patent: Jun. 28, 2016

(54) INTRUSION DETECTION MECHANISM

(71) Applicant: Cisco Technology, Inc., San Jose, CA (US)

(72) Inventors: Harel Cain, Jerusalem (IL); Yaron Sella, Beit Nekofa (IL); Michal Devir, Haifa (IL); David Wende, Mevaseret Zion (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/600,129

(22) Filed: Jan. 20, 2015

(51) Int. Cl.
   *H04L 29/06* (2006.01)

(52) U.S. Cl.
   CPC ............ *H04L 63/1425* (2013.01); *H04L 63/08* (2013.01); *H04L 63/1416* (2013.01)

(58) Field of Classification Search
   CPC .. H04L 63/1416; H04L 63/1425; H04L 63/08
   USPC .......................................................... 726/23
   See application file for complete search history.

(56) References Cited

U.S. PATENT DOCUMENTS

| | | | |
|---|---|---|---|
| 8,126,611 B2 | 2/2012 | Isoyama | |
| 2002/0161820 A1* | 10/2002 | Pellegrino | G06F 8/20 709/201 |
| 2004/0027076 A1* | 2/2004 | Shimizu | B63L 3/0084 318/55 |
| 2006/0028323 A1* | 2/2006 | Ohno | G01G 1/0962 340/425.5 |
| 2006/0031582 A1* | 2/2006 | Pugel | H04L 12/1895 709/246 |
| 2007/0030844 A1* | 2/2007 | Fukuta | G07B 15/063 370/359 |
| 2008/0092227 A1 | 4/2008 | Eibach et al. | |
| 2014/0247122 A1 | 9/2014 | Moeller et al. | |
| 2014/0324278 A1* | 10/2014 | Teng | G07C 5/008 701/31.5 |

FOREIGN PATENT DOCUMENTS

| | | | | |
|---|---|---|---|---|
| IL | WO 2013144962 A1 * | 10/2013 | ............. | H04L 63/14 |
| WO | 2013/144962 | 10/2013 | | |

OTHER PUBLICATIONS

FlexRay—can be found at: http://en.wikipedia.org/wiki/FlexRay—Nov. 2014.
LIN (Local Interconnect Network)—can be found at http://en.wikipedia.org/wiki/Local_Interconnect_Network—Nov. 2014.
Corrigan, Steven; Introduction to the Controller Area Network (CAN), Texas Instruments Application Report, SLOA101A-Aug. 2002-Revised Jul. 2008.

* cited by examiner

*Primary Examiner* — Dao Ho
(74) *Attorney, Agent, or Firm* — Samuel M. Katz; David Zviel

(57) ABSTRACT

In one embodiment, a method implemented on a node connected to a network bus includes: storing one or more message identifiers, the one or more identifiers comprising at least one message identifier identifying the node, the at least one message identifier being included in a message at a time when the message is sent by the node onto the network bus; monitoring network bus traffic, the network bus traffic comprising messages transmitted by the node and by other nodes connected to the network bus; and alerting a processor of the node if a message transmitted on the network bus by at least one of the other nodes is identified as having a message identifier corresponding to the at least one message identifier.

16 Claims, 2 Drawing Sheets

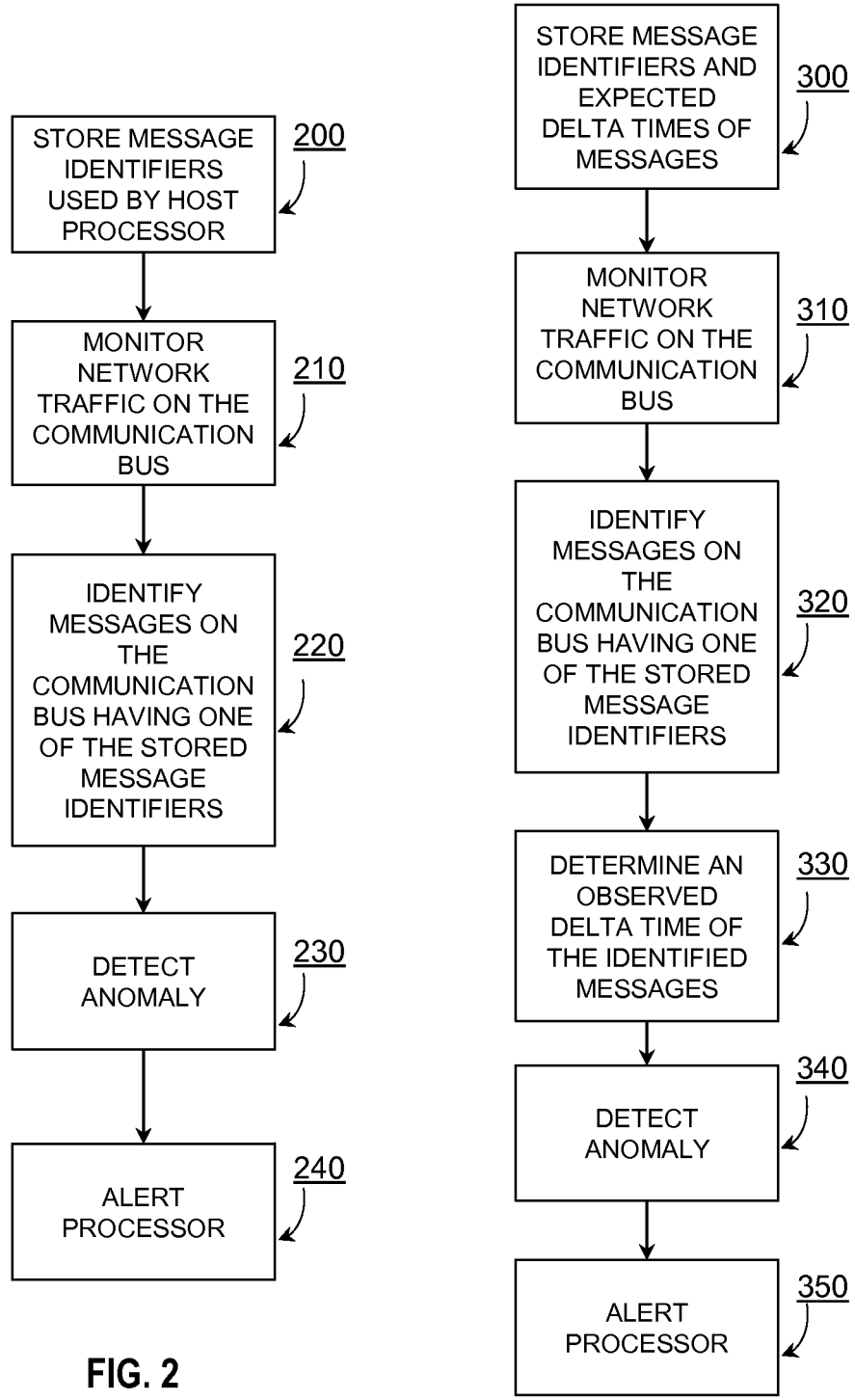

INTRUSION DETECTION MECHANISM

TECHNICAL FIELD

The present disclosure generally relates to methods and apparatus to detect attacks on electronic control units of a vehicle.

BACKGROUND

Modern vehicles typically have a multiplicity of embedded systems called Electronic Control Units (ECUs) configured to control one or more of their component electrical systems or sub-systems. For example, ECUs may be used to control a vehicle's engine, transmission, brakes, suspension, etc. A vehicle may therefore be typically configured with dozens of such ECUs to control its operation. ECUs may typically communicate between themselves using wired buses.

Most modern vehicles are also now equipped with a variety of wireless interfaces which increase their exposure/vulnerability to remote attacks by hackers and/or random interference from other wireless communications. Typically, an attack on an ECU may be achieved using any of its data connections (physical or wireless) and may consist of executing malicious code to gain control of the ECU. The compromised ECU may then be used as an entry point for the attack or further attacks such as, for example, sending malicious or illicit messages to other (sensitive) ECUs.

BRIEF DESCRIPTION OF THE DRAWINGS

The present invention will be understood and appreciated more fully from the following detailed description, taken in conjunction with the drawings in which:

FIGS. 2 and 3 are simplified flow chart diagrams of alternative methods for alerting a processor of an anomaly detection in accordance with embodiments of the present invention.

DESCRIPTION OF EXAMPLE EMBODIMENTS

Overview

In one embodiment, a method implemented on a node connected to a network bus includes: storing one or more message identifiers, the one or more identifiers comprising at least one message identifier identifying the node, the at least one message identifier being included in a message at a time when the message is sent by the node onto the network bus; monitoring network bus traffic, the network bus traffic comprising messages transmitted by the node and by other nodes connected to the network bus; and alerting a processor of the node if a message transmitted on the network bus by at least one of the other nodes is identified as having a message identifier corresponding to the at least one message identifier.

DETAILED DESCRIPTION OF EXAMPLE EMBODIMENTS

Figure 1A:
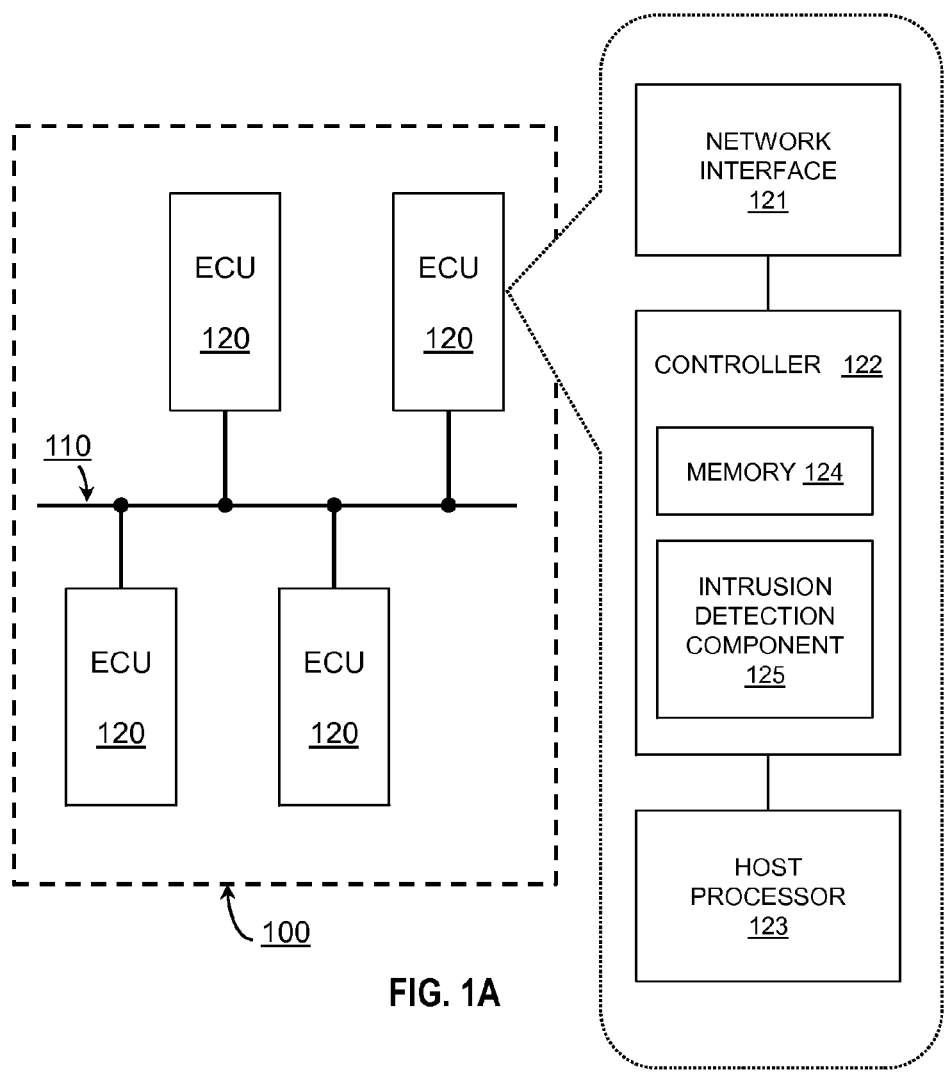
FIG. 1A is a simplified pictorial illustration of an exemplary vehicle with an intrusion detection component, constructed and operative in accordance with an embodiment of the present invention.

Reference is now made to FIG. 1A, which shows an exemplary vehicle with an intrusion detection component constructed and operative in accordance with an embodiment of the present invention. A vehicle 100 is shown in FIG. 1A and typically comprises at least one vehicle's communication bus 110 which is an internal communication network that interconnects a plurality of nodes 120 (hereinafter referred as Electronic Control Units (ECUs) 120) inside the vehicle. Examples of vehicle's communication buses typically include any type of Vehicle Area network such as, but not limited to, CAN (Controller Area Network) defined in ISO 11898-1:2003 and also described in greater details in http://www.ti.com/lit/an/sloa101a/sloa101a.pdf, LIN (Local Interconnect Network) described in further details on h_t_t_p://en.wikipedia.org/wiki/Local_Interconnect_Network, FlexRay described in further details on h_t_t_p://en.wikipedia.org/wiki/FlexRay, etc. In the following description, the communication bus 110 will be referred as the CAN bus 110.

A plurality of ECUs 120 are coupled to the CAN bus 110. These ECUs 120 are typically Electronic Control Units (ECUs) configured to control one or more of their associated electrical systems or sub-systems. Non-limiting examples of such ECUs typically include, but are not limited to including: engine control module (ECM); powertrain control module (PCM); transmission control module (TCM); central control module (CCM); anti-lock braking system module (ABSM); central timing module (CTM); general electronic module (GEM); body control module (BCM); suspension control module (SCM); etc. Although described as separate modules, it will be apparent to those skilled in the art that one module may incorporate a plurality of the control modules listed hereinabove.

Each ECU 120 typically comprises at least: a network interface 121; a CAN controller 122; and a host processor 123. The host processor 123 is typically a CPU (central processing unit) or microprocessor operable to interpret the messages received from other components or sub-components of the vehicle (e.g. from other ECUs 120), and also to decide which messages to send out/transmit. Although not shown in FIG. 1A, the host processor 123 may be connected to actuators, sensors, switches, or any other appliances that the ECU 120 is configured to control.

The CAN controller 122, which may sometimes be integrated with the host processor 123, is generally operable to receive messages from the CAN bus 110 via the network interface 121 and pass the messages received from the host processor 123 to the network interface 121 for further distribution via the CAN bus 110. The CAN controller 122 typically comprises a memory 124 for storing bits serially received from the CAN bus 110 until an entire message is available. Once stored in memory 124, the message may be fetched by the host processor 123 for further processing. The memory 124 is also configured to storing a message received from the host processor 123 that are to be transmitted to other (sub-) components of the vehicle 100. The CAN controller 122 typically transmits the message bits serially onto the CAN bus 110.

As mentioned above, the ECU 120 also comprises a network interface 121 which is typically a CAN transceiver such as, but not limited to, a CAN transceiver defined by ISO 11898-2/3 Medium Access Unit standards. In one embodiment, the role of the network interface 121 may be to drive and to detect data to and from CAN bus 110. Network interface 121 converts the single-ended logic used by the CAN controller 122 to a differential signal transmitted over the CAN bus 110. Network interface 121 also determines a bus logic state from the differential signal or voltage, rejects common-mode noise, and outputs a single-ended logic signal to the CAN controller 122.

Each ECU 120 is operable to communicate with other ECUs 120 as necessary via the CAN bus 110. Some of the ECUs 120 form independent subsystems while others require exchanging data with other ECUs 120. Indeed, during normal operation of vehicle 100, an ECU 120 may need to control actuators or receive feedback from one or more sensors through the CAN bus 110. Communication between ECUs 120 is performed over the CAN bus 110 using any suitable protocol and messaging system, as will be appreciated by those skilled in the art.

Figure 1B:
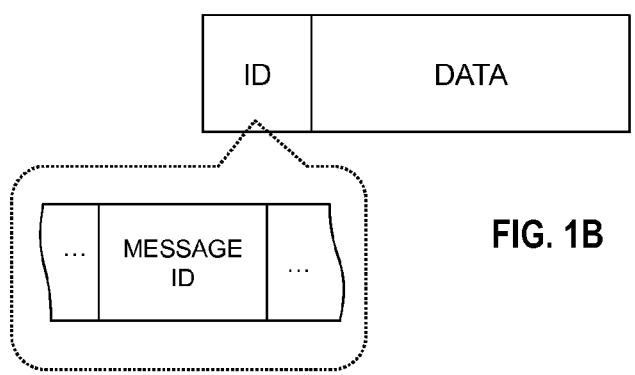
FIG. 1B is a simplified pictorial illustration of an exemplary message transmitted over the communication network, constructed and operative in accordance with an embodiment of the present invention.

Each message sent and/or transmitted over the CAN bus 110 typically has a pre-defined format comprising at least an identifier (ID) field and a data section (as shown in FIG. 1B), both of them including data produced by one sending ECU 120. The data section corresponds to the current information that needs to be exchanged between a sending ECU (e.g. a first ECU 120) and a receiving ECU (e.g. a second ECU 120). The ID field includes a message ID which may be eleven or twenty-nine bits long in CAN networks. The message ID typically indicates the priority of the message and is typically associated with a unique ECU 120. The message ID may therefore be used as an ID for identifying a particular ECU 120. In other words, the same message ID cannot be used by two different ECUs 120 on the same CAN bus.

During normal operation, a CAN controller 122 of a particular ECU 120 is typically operable to read every message (i.e. every single bit) that passes on the CAN bus 110. The CAN controller 122 typically determines whether or not a particular message has to be processed based on the message ID. For example, when the CAN controller 122 receives a message, the message ID of the message may be used to determine whether or not the message is relevant and/or interesting for the particular ECU 120. In such a situation, the CAN controller 122 alerts the host processor 123 that a message has arrived. The message is then copied in a memory (not shown in FIG. 1A) of the host processor 123 space and processed. Otherwise, the message is ignored, that is to say not processed and the CAN controller 122 continues to monitor other messages transiting onto the CAN bus 110. However, there are many ways attacks may be accomplished once access to the CAN bus 110 is gained and/or when an ECU 120 is compromised. For example, an attack may consist of impersonating a particular ECU 120 for sending false messages to another ECU 120. Another similar example may consist of sending these false messages at a higher rate than normal messages thereby saturating the CAN bus 110 and preventing the normal messages from being received by some ECUs 120. In both cases, such attacks may either alter the proper functioning of the vehicle 100 or have a harmful effect on the passengers and/or the vehicle 100.

In an exemplary embodiment of the present invention, the CAN controller 122 further comprises an intrusion detection component 125 which is able to detect such attacks. Typically, the intrusion detection component 125 (IDC) is operable to monitor the CAN bus 110 to detect anomalies appearing in different messages forming the CAN bus traffic. An IDC 125 may be incorporated into each CAN controller 122 of each ECU 120, thereby enabling each ECU 120 to individually analyze the messages on the CAN bus 110 and detect anomalies in a cheap and efficient manner at a hardware and/or firmware level. Whenever an IDC 125 of an ECU 120 detects an anomaly, the CAN controller 122 alerts the host processor 123 which then take remedial or protective actions. Additionally and/or alternatively, an interrupt signal may be generated by the IDC 125 and sent to the host processor 123 if the latter is able to handle such interrupts. As a result, different actions may be taken depending on the ECU 120 that has detected the anomaly. For example, a visual indication may be displayed on the vehicle's front panel thereby alerting the driver that something is going wrong. Another example may be to record the detected anomaly and store it in a non-volatile memory so that a mechanic may be notified at the time when the vehicle is being repaired or checked. A further non-limiting example available for connected vehicles may be to send an alert to a call center or a central server external to the vehicle 100 in order to receive assistance regarding the issue in a (near) real-time fashion or even at a later time after further analysis of the alert(s) by the central/call center.

Reference is now made to FIG. 2, which is a simplified flow chart diagram illustrating a method for alerting a processor of an ECU of an anomaly detection in accordance with an embodiment. In an example embodiment, the IDC 125 is configured to detect anomalies associated with messages sent by an ECU 120 using the message IDs. At step 200, the IDC 125 stores the message IDs used by the host processor 123 of the ECU 120 for sending messages to other ECUs 120 via the CAN bus 110. The message IDs may be stored in any suitable manner in a memory (not shown in FIG. 1A) of the IDC 125 or the CAN controller 122. The message IDs may be either provided to the IDC 125 directly by the host processor 123 of the ECU 120 or dynamically extracted by the IDC 125 at the time when messages are sent by the ECU 120. In the latter case, when a message is to be sent by the ECU 120 to another ECU 120 through the CAN bus 110, the host processor 123 of the ECU 120 typically prepares and transmits the message to its CAN controller 122. The message is received by the CAN controller 122 which stores it in its memory 124 prior to transmitting the bits serially onto the CAN bus 110 via the network interface 121. At the time when the message is being stored into the memory 124, the IDC 125 is configured to extract the message ID from the message, and to record the message ID. The IDC 125 is further configured to monitor the CAN bus traffic (step 210) and identify messages transiting onto the CAN bus 110 which have a message ID matching one of the recorded message IDs (step 220) and which were sent by other ECUs 120. When such a message is identified on the CAN bus 110 at step 230, this is an anomaly indicating that the CAN network of the vehicle 100 is being attacked. This typically means that false messages impersonating a particular ECU 120 are present onto the CAN bus 110. As a result, the IDC 125 detects this anomaly (step 230) and alerts and/or sends an interrupt signal to the host processor 123 at step 240.

Reference is now made to FIG. 3, which is a simplified flow chart diagram illustrating an alternate method for alerting a processor of an ECU of an anomaly detection in accordance with an embodiment. In another further example embodiment, the intrusion detection component 125 is configured to detect anomalies associated with messages sent by an ECU 120 using the message IDs and an expected delta time at which such messages are sent. In normal CAN network configurations, there is a particular delta time or time interval associated with messages sent and/or received by particular ECUs 120. For example, a message corresponding to the number of rounds per minute (RPM) of the vehicle's engine is sent at very regular intervals (e.g. every ten milliseconds) and is to be sent by the ECM and received by the TCM. Therefore, at step 300, the IDC 125 of an ECU 120 is operable to store one or more message IDs along with their expected delta times at which subsequent messages carrying the same type of information (i.e. having a same message ID) are expected to be observed on the CAN bus 110. As explained hereinabove in relation to the method of FIG. 2, the message IDs and the expected delta times may be stored in any suitable manner in a memory (not shown in FIG. 1A) of the IDC 125 or the CAN controller 122. In a situation where the messages correspond to messages sent and/or received by the ECU 120, the message IDs and the expected delta times may be either provided directly to the IDC 125 by the host processor 123 or dynamically extracted/calculated by the IDC 125 at the time when messages are sent or read by the ECU 120. Furthermore, the ECU 120 may also be operative to implement the method for messages that simply transit onto the CAN bus 110 i.e. messages that need not to be processed by the ECU 120. In the latter case, the message IDs and the expected delta times may be provided to the IDC 125 by the host processor 123 or from an external source. In any case, the IDC 125 of the ECU 120 is further operable to monitor the CAN bus traffic (step 310) for identifying messages having message IDs matching one of the recorded message IDs (step 320). Once such a message ID is identified at step 320, the IDC 125 is operable to determine a delta time at which the message is observed on the CAN bus 110 (step 330). To do so, the IDC 125 retrieves a present time, typically corresponding to the time at which the message was observed, and determines a present delta time. The present delta time corresponds to the time difference between the arrival of the present message and the arrival of the last message having a same specific message ID. Then, the present delta time is compared to the expected delta time stored in the memory. At step 340, the IDC 125 is therefore able to detect an anomaly if the present delta time does not match the expected delta time. In such a situation, this is an anomaly that may be indicating that the CAN network of the vehicle 100 is being attacked. This typically means that false messages are sent in order to saturate the CAN bus 110 or that counterfeit messages are being sent out onto the CAN bus 110. As a result, the IDC 125 alerts and/or sends an interrupt signal to the host processor 123 (step 350).

In an example implementation of the alternate anomaly detection method of FIG. 3, the IDC 125 typically includes a counter which is incremented at fixed intervals (e.g. every millisecond). During normal operation, the following information is stored in the memory and available to the IDC 125 for each message ID relevant to the ECU 120:

$C_p$: counter value at the time when the previous message was observed on the CAN bus 110; and $\Delta t_{ref}$: reference delta time provided by the host processor 123.

When a message is observed on the CAN bus 110 and read by the CAN controller 122, the message ID is extracted and the IDC 125 uses the present value of the counter $C_c$ to compute the present delta time $\Delta t_c$ (i.e. time interval at which two consecutive message with the same message ID are observed on the CAN bus 110) as follows:

$$\Delta t_c = C_c - C_p$$

The present computed delta time ($\Delta t_c$) is then compared to the reference delta time ($\Delta t_{ref}$). The reference delta time ($\Delta t_{ref}$) is typically provided as a range and the present computed delta time ($\Delta t_c$) is compared to the upper and lower boundaries. These upper and lower boundaries typically correspond to maximum and minimum delta times or time intervals at which two consecutive messages having a same message ID can be observed onto the CAN bus 110 in normal operation. If the present computed delta time ($\Delta t_c$) is more than the maximum reference delta time and/or is less than the minimum reference delta time, then an alarm signal is generated and sent to the host processor 123. Subsequently, whether or not an alarm signal has been generated, the $C_p$ value is updated i.e. set to the current value $C_c$ and stored in memory. Those skilled in the art will appreciate that the maximum and minimum reference delta times may not be available or known thereby preventing the host processor 123 for providing them to the IDC 125. In such a situation, default values may be used by the IDC 125 such as for example zero for the minimum reference delta time and positive infinity for the maximum reference delta time.

Additionally and/or alternatively, a previous computed delta time ($\Delta t_p$) is stored in memory and is available to the IDC 125 for each message ID relevant to the ECU 120. The previous computed delta time ($\Delta t_p$) may correspond, for example, but not limited to, to the time difference between the time at which the second last message was observed and the time at which the last message was observed. The present computed delta time ($\Delta t_c$) is then compared the previous computed delta time ($\Delta t_p$) which is therefore used as the expected delta time or as an additional expected delta time if the present computed delta time ($\Delta t_c$) was first compared to the reference delta time ($\Delta t_{ref}$). If the present computed delta time ($\Delta t_c$) is different from the previous computed delta time ($\Delta t_p$) or if a difference (in absolute value) between the present computed delta time ($\Delta t_c$) and the previous computed delta time ($\Delta t_p$) exceeds a predefined and configurable threshold, an alarm signal is generated and sent to the host processor 123. Subsequently, the $C_p$ value is updated i.e. set to the current value $C_c$ and stored in memory. Also, the present computed delta time ($\Delta t_c$) is stored in memory in place of the previous computed delta time ($\Delta t_p$).

Those skilled in the art will appreciate that the method described in the previous paragraphs may be achieved using a single counter. However, in another example, a plurality of counters may be provided typically one counter per type of messages (message ID) that the IDC 125 is instructed to monitor. In the latter case, the present delta time is determined directly by using the counter present value. The counter present value used for the delta time determination is then reset to zero. The other method steps remain unchanged.

The alarm signal may be a direct and/or an interrupt signal generated and sent by the IDC 125 to the host processor 123. Additional information may further be associated with the direct and/or interrupt signals during the generating step to indicate to the host processor 123 that a type of detected anomaly or merely that an anomaly has been detected. Another exemplary way to alert the host processor 123 of the detected anomaly may be to wait for the host processor 123 pulling/sampling the contents of the received message from the CAN controller 122. Upon detection of an anomaly, the IDC 125 may be operable to add few "alerting" bits into the original message indicating the detection and type of anomaly. Then, when the host processor 123 processes the message transmitted from the CAN controller 122, it is alerted of the attack and may take some remedial or protective actions.

By implementing such a method, the host processor 123 may be alerted whenever a change in the delta time at which messages having a specific ID are observed on the CAN bus 110 occurs. However, those skilled in the art will appreciate that the delta time at which certain messages are transmitted and/or received at some ECUs 120 may change over time as part of the normal operation of the vehicle 100. Taking again the example of the number of rounds per minute of the vehicle's engine, the corresponding message, although initially transmitted every ten milliseconds, may then be transmitted every five milliseconds under certain circumstances but still as part of the normal operating mode of the vehicle 100. In this case, the IDC 125 may be informed directly by the host processor 123 of such a change or may update the expected delta time in the memory after having observed two or more consecutive messages with such new delta time. However, in order to avoid false alarms due to such delta time changes, the IDC 125 may generate and send an alarm signal only when repetitive anomalies are detected (e.g. for a certain number of consecutive messages; and/or for a certain number of messages during a pre-defined period of time; etc.). Conversely, the IDC 125 may generate and send the alarm signal whenever an anomaly is detected while the host processor 123 is configured to take remedial or protective actions only if it receives repetitive alarm signals (e.g. a certain number of consecutive alarm signals and/or a certain number of alarm signals received during a pre-defined period of time) from the IDC 125.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method implemented on a node connected to a network bus, said method comprising:
    storing one or more message identifiers, said one or more identifiers comprising at least one message identifier identifying said node, said at least one message identifier being included in a message at a time when said message is sent by said node onto said network bus;
    monitoring network bus traffic, said network bus traffic comprising messages transmitted by said node and by other nodes connected to said network bus; and
    alerting a processor of said node when a message transmitted on said network bus by at least one of said other nodes is identified as having a message identifier corresponding to said at least one message identifier,
    wherein said stored one or more identifiers comprises at least one message identifier identifying at least one node connected to said network bus, said at least one message identifier being included in a message at a time when said message is sent by said at least one node onto said network bus;
    said storing further comprises storing an expected delta time along with said at least one message identifier identifying said at least one node, said expected delta time corresponding to a time difference associated with times at which two consecutive messages including said at least one message identifier are expected to be observed on said network bus;
    said method further comprising determining a present delta time for a present message of said network traffic having said stored at least one message identifier, said present delta time corresponding to a time difference associated with times at which said present message and a last message having said stored at least one message identifier are observed on said network bus; and
    said alerting comprises alerting a processor of said node when said determined present delta time is different from said stored expected delta time;
    wherein a previously determined delta time is used as said stored expected delta time;
    wherein said alerting comprises alerting the processor of said node when a difference, in absolute value, between said determined present delta time and said previously determined delta time exceeds a predefined threshold.

2. The method of claim 1, wherein said stored expected delta time comprises a maximum delta time and a minimum delta time; and said alerting comprises alerting the processor of said node when said determined present delta time is more than said maximum delta time or is less than said minimum delta time.

3. The method of claim 1, wherein said stored expected delta time comprises a maximum delta time, a minimum delta time and a previously determined delta time; and said alerting comprises alerting the processor of said node when one or more of the following conditions is met:
    said determined delta time is more than said maximum delta time;
    said determined delta time is less than said minimum delta time;
    a difference, in absolute value, between said determined present delta time and a previously determined delta time exceeds a predefined threshold.

4. The method of claim 1, wherein said determining comprises:
    retrieving a first time value from a counter of said node, said first time value corresponding to a time at which said present message is observed on said network bus;
    retrieving a second time value from a memory of said node, said second time value corresponding to a time at which said last message was observed on said network bus; and
    determining a present delta time by computing a time difference between said first and second time values.

5. The method of claim 4, further comprising:
    after said retrieving a second time value, storing said first time value in said memory in place of said second time value.

6. The method of claim 1, wherein said determining comprises:
    providing one or more counters at said node, each counter being associated with a single message identifier;
    retrieving a time value from a counter associated with said at least one message identifier, said time value corresponding to a time at which said present message is observed on said network bus; and
    determining a present delta time by using said retrieved time value.

7. The method of claim 6, further comprising:
    resetting said counter to zero after having determined said present delta time.

8. The method of claim 1, wherein said alerting further comprises:
    generating an alarm signal when said determined delta time is different from said expected delta time; and
    sending said generated alarm signal to said processor of said node.

9. The method of claim 8, wherein said alarm signal is generated and sent to said processor whenever said determined delta time is different from said expected delta time.

10. The method of claim 8, wherein said alarm signal is generated and sent to said processor when a certain number of determined delta times for a certain number of messages having said at least one message identifier are different from said expected delta time.

11. The method of claim 8, wherein said alarm signal is generated and sent to said processor when a certain number of determined delta times for messages having said at least one message identifier are different from said expected delta time during a predefined period of time.

12. The method of claim 8, wherein said alarm signal comprises an interrupt signal associated with additional information, said additional information indicating a type of detected anomaly.

13. The method of claim 8, wherein: said generating comprises:
   retrieving said present message; and
   inserting additional bits in said retrieved present message, said additional bits indicating to said processor a type of detected anomaly; and
   said sending comprises sending said retrieved present message including said inserted additional bits to said processor of said node.

14. A node connected to a network bus, said node comprising:
   a network interface;
   a processor; and
   a controller;
   wherein said controller further comprises an intrusion detection component operable to:
      store one or more message identifiers, said one or more message identifiers comprising at least one message identifier identifying said node, said at least one message identifier being included in a message at a time when said message is sent by said node onto said network bus;
      monitor network bus traffic, said network bus traffic comprising messages transmitted by said node and by other nodes connected to said network bus; and
      alert said processor when a message transmitted on said network bus by at least one of said other nodes is identified as having a message identifier corresponding to said at least one message identifier,
   wherein said stored one or more identifiers comprises at least one message identifier identifying at least one node connected to said network bus, said at least one message identifier being included in a message at a time when said message is sent by said at least one node onto said network bus; and
   said intrusion detection component being further operable to:
      store an expected delta time along with said at least one message identifier identifying said at least one node, said expected delta time corresponding to a time difference associated with times at which two consecutive messages including said at least one message identifier are expected to be observed on said network bus;
      determine a present delta time for a present message of said network traffic having said stored at least one message identifier, said present delta time corresponding to a time difference associated with times at which said present message and a last message having said stored at least one message identifier are observed on said network bus; and
      alert said processor when said determined present delta time is different from said stored expected delta time;
      wherein a previously determined delta time is used as said stored expected delta time;
      wherein said alerting comprises alerting the processor of said node when a difference, in absolute value, between said determined present delta time and said previously determined delta time exceeds a predefined threshold.

15. The node of claim 14, wherein said intrusion detection component is further operable to extract said at least one message identifier from a message received from said processor of said node that is to be transmitted onto said network bus.

16. The node of claim 14, wherein said expected delta time is provided by said processor.

\* \* \* \* \*